Dec. 29, 1964  F. E. IVES  3,163,689
METHOD OF MANUFACTURING PLASTIC PANELS AND APPARATUS THEREFOR
Filed Sept. 16, 1957  2 Sheets-Sheet 1
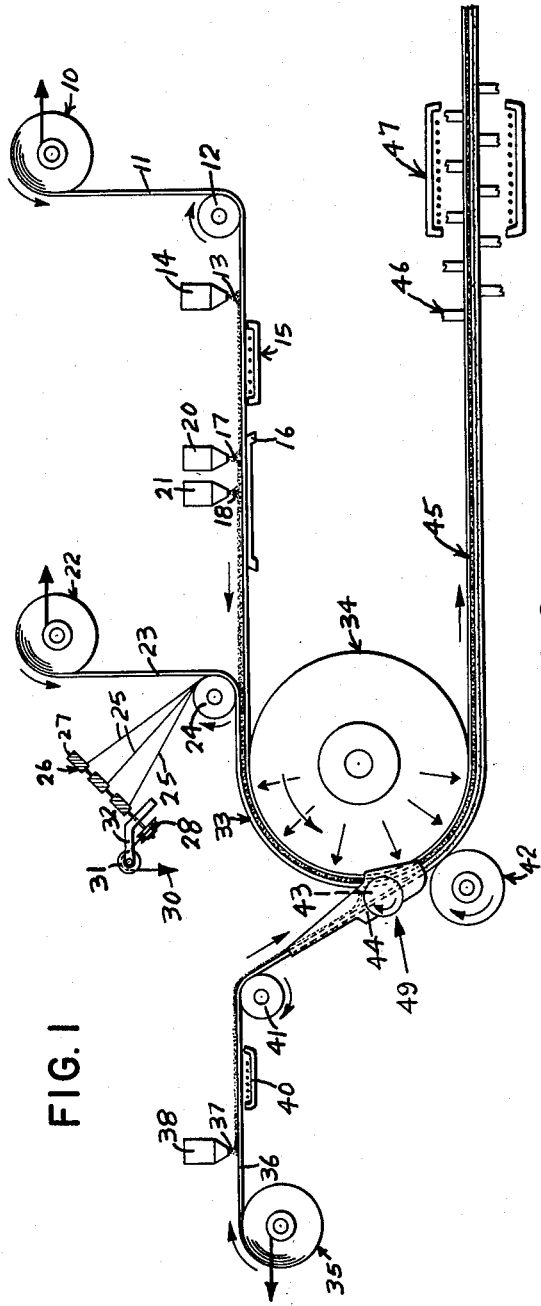
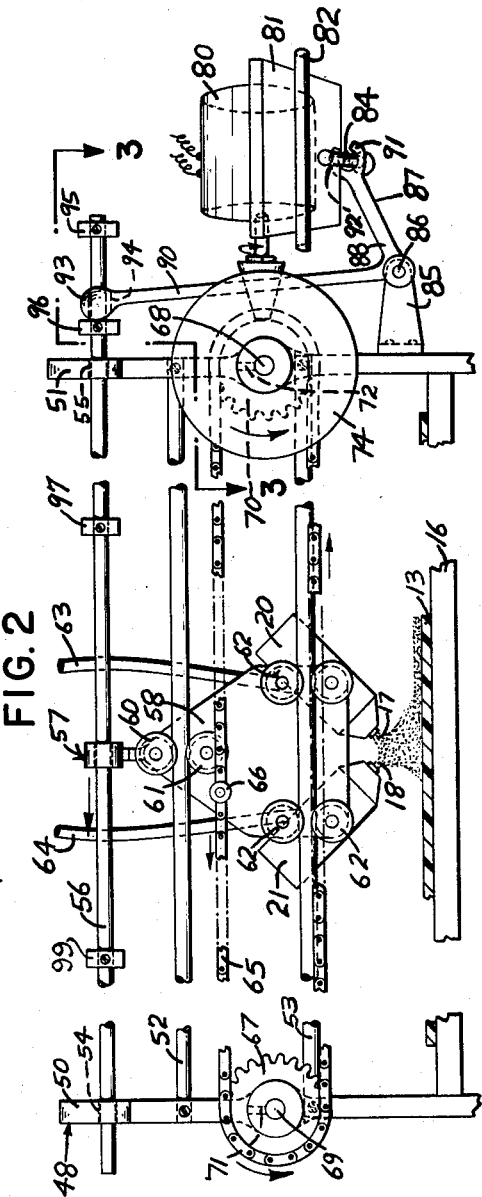
INVENTOR
FRANK E. IVES
BY
TW Secrest
ATTORNEY Dec. 29, 1964    F. E. IVES    3,163,689
METHOD OF MANUFACTURING PLASTIC PANELS AND APPARATUS THEREFOR
Filed Sept. 16, 1957    2 Sheets-Sheet 2

INVENTOR
FRANK E. IVES
BY
T W Secrest
ATTORNEY

United States Patent Office 3,163,689
Patented Dec. 29, 1964

3,163,689
METHOD OF MANUFACTURING PLASTIC PANELS AND APPARATUS THEREFOR
Frank E. Ives, 15820 Benson Road, Renton, Wash.
Filed Sept. 16, 1957, Ser. No. 684,099
7 Claims. (Cl. 264—90)

This invention relates to a plastic and, more particularly, to a method and means for manufacturing a plastic.

In the manufacture of plastic panels there is usually employed fibrous matting. This fibrous mat is impregnated with a liquid resin and the resin cured to form a plastic panel or sheet. The use of such plastic panels is well-known as they are used for fences, roofs on sheds, carports, sky lights and many other decorative structural purposes. As with all types of structural materials these panels weather. In the weathering process the resin is removed and leaves the strands of fibrous mat on the surface of the panel. As these strands are usually of a durable material, fiberglass, they do not weather as rapidly as the resins. In time, the surface of the panel has a number of these strands projecting outwardly therefrom and appears to need a shave. In order to maintain the decorative appearance of the panel it is actually necessary to shave the panel or refinish the panel with a coat of resin.

As another feature in the manufacture of plastics it is not possible to use the most rapid setting catalyst. For example, the fibrous mat is impregnated with the resin by carrying it through a tank of the resin. As this reservoir of resin must be used for a relatively long period of time such as a half hour and longer, it is not possible to use rapid and quick setting resins as the resins will set up in the reservoir or tank. More particularly, the resins will not remain in the liquid form but will cure and solidify. Therefore, because of the extremely short life of the most rapid setting resins it is not possible to use these.

In the manufacture of plastics having a fibrous base there is encountered the problem of entrapped gas in the fibrous material. In this regard it has not been possible in the past to completely eliminate the residual or entrapped gas. With this entrapped gas in the mat and upon the curing of the resin there appear a large number of small gas bubbles in the resin. Naturally, this mars the appearance of the finished panel. When the quantity of gas bubbles becomes too large the panel must be rejected and sold as a second or a lower grade panel. Furthermore, in the manufacture of plastics in the sheet or panel form by a continuous process the resin impregnated mat is passed through dies. These dies are of a relatively close tolerance and if the mat happens to be of an imperfect form, i.e., a lump of the mat or a gathering of the mat in a clump, the mat will not pass through the dies. In addition, the mat will tend to ball up or roll up in the dies. This necessitates the shutting down of the apparatus, the clearing away of the gathered resin-impregnated mat before more plastic panels and sheets can be manufactured.

In the manufacture of corrugated panels the ridges are thin and the valleys are heavy with resin. This is partially due to the resin, of a relatively low viscosity because of not being cured, running out of the peaks and into the valleys. The use of a faster curing resin would eliminate this thinning and thickening process. However, the use of rapidly curing resins is not feasible with existing equipment and processes.

With this knowledge in mind I have invented a method for making a plastic panel having a protective surface coating over the resin-impregnated fibrous mat and also means for carrying out this method. More particularly, I use as a carrier sheet a flexible film such as cellophane. Liquid resin is laid down on this film and the resin partially cured. Then additional liquid resin is laid on the partially cured resin and a fibrous base material laid on top of the liquid resin. As is appreciated, the liquid resin works its way up through the fibrous material by capillary action. Also, the fibrous material by the pull of gravity settles into the liquid resin. The flexible sheet with resin and mat on it is pulled around a curved means such as a drum so that the liquid resin has a further opportunity to work its way through the mat. In fact, the pulling of the resin impregnated mat around the drum and the radial pressure exerted on the mat forces the liquid resin into it. Then, a second flexible sheet with a thin coat of partially cured resin on it is applied to the surface of the mat. However, in the application of the second flexible sheet the sandwich of the sheet, partially cured resin, resin, fibrous mat, partially cured resin, and second flexible sheet, is passed between the nip of two rolls so as to compress the sandwich and force some of the resin out of the fibrous material. In forcing the resin out of the material the remainder of the residual entrapped gas is also forced out. In this manner, it is seen that the gas in the mat is forced out of the same.

One of the means I employ to accomplish this, and suitable for using a fast-setting resin, is to have an apparatus for mixing two different resins. These resins contain difference catalysts, which cannot ordinarily be used in the same resin as the resin then sets or cures extremely rapidly. To get around this limitation the catalysts are used in two different resins and the resins mixed just prior to use. In this manner it is possible to have a long pot life for each resin and yet to have a short curing or setting up time for the two resins.

In order to circumvent the stopping of the apparatus when there is an imperfection in the fibrous material such as large lumps or gatherings of the individual fibers I employ offset dies. These can be made with a large degree of tolerance so as to pass the imperfection. Furthermore, there is more inherent flexibility in the use of offset dies than matched dies, thereby passing the imperfection.

Inherent advantages following from my process and equipment are readily apparent from the manufacture of corrugated panels. As is appreciated the rapid curing of the resins, because of the catalysts, precludes the draining of the resin out of the peaks and into the valleys, resulting in thin and thick sections.

Accordingly, an object of this invention is the provision of a plastic panel having a fibrous base but with a protective layer of resin over the fibrous base.

A further object is the provision of a plastic material requiring less upkeep than presently available plastic material.

An additional object is to provide a plastic which gives better appearance both when new and upon aging.

A still further object is the provision of a plastic having a longer life than the presently available plastics.

Another object is to provide a plastic free of entrapped or residual gas.

A still additional object is the provision of a method for using rapid setting or quick curing resins.

Another important object is to provide a method for expelling residual or entrapped gas from fibrous material in the making of a plastic.

A still further object is the provision of a method for using offset dies so as to increase production.

Another important object is to provide a method for making a plastic at a lower cost than presently used methods.

In the drawings:

FIGURE 1 is a schematic outline of a preferred method employed for making the plastic;

FIGURE 2 is a fragmentary elevation view of the apparatus used for mixing two different resins immediately prior to their application in the formation of a plastic sheet.

Figure 3:
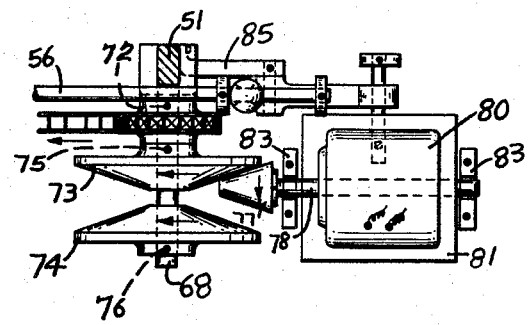
FIGURE 3 is a fragmentary plan view of the control means for applying the two different resins and is taken on line 3—3 of FIGURE 2.

Referring to the drawings it is seen that the invention comprises a method for making a plastic and means for carrying out this method. FIGURE 1 is a schematic outline of both the method and the means for carrying out the invention. More particularly, reference numeral 10 refers to roll of a flexible material in sheet form. This sheet is designated by 11 and passes under roller 12. After leaving roller 12 a resin 13 is applied to the sheet from resin applier 14. The sheet passes over a set means 15 where the temperature of both the sheet and the resin are raised considerably. By raising the temperature of the resin 13 the same is partially cured or set. The sheet and resin are then passed over a table 16 and additional resins 17 and 18 are applied over the partially cured resin 13. Nozzles 20 and 21 can be used for applying the resins 17 and 18. Reference numeral 22 refers to a roll of fibrous material. A sheet 23 of this material passes under roller 24. Roller 24 is positioned slightly above the flexible sheet 11 and such a distance above this sheet that it forces the material 23 into the liquid resins 17 and 18. There is applied on top or over the material 23 a number of strands 25 such as fiberglass or other synthetics. These strands are on spools 26 on a shaft 27. The shaft is held in position by pulley 28 which is attached to a weight 30 which overhangs pulley 31. Also, the shaft 27 is positioned by means of bracket 32 which connects with pulley 31. These strands 25 run around roller 24 and between this roller 24 and the mat 23 so that they are substantially pressed into 23.

At this stage there is a composite 33 of flexible sheet 11, partially cured resin 13, a mixture of liquid resins 17 and 18, a fibrous material 23 and strands 25. Also, the liquid resins 17 and 18 are working their way up through the fibrous material 23 so as to expel extraneous or residual gas in this material. Part of this working action is due to capillary action of the material 23 and part is due to the force of gravity pulling the material 23 but mostly due to the radial pressure on the roll 34 so as to force the mat into the resin. The radial pressure exerted on the mat plays a vital part in forcing the liquid resin into it. The composite 33 is pulled around roller 34 so that the fibrous material 23 is on the outside of the roller and the flexible sheet 11 is touching the roller.

Another flexible sheet is applied to the outer surface of the fibrous material 23. More particularly, 35 designates a roll of the second flexible sheet 36. There is applied on top of this flexible sheet a resin 37 from container 38. The sheet and resin pass over a heating means 40 and a roller 41. As is appreciated, the heating means 40 partially cures or partially sets the resin 37. The sheet 36 and partially cured resin are contacted with the composite 33 by passing both of these between the nip of the roll 34 and a roll 42 positioned somewhat underneath the roll 34. In the fibrous material 23 there is liquid resin. Upon running this resin impregnated fibrous material between the nip of the rollers 42 and 34 some of this resin is squeezed out of the fibrous material and collects in a pool or reservoir 43 between the composite 33 and the flexible sheet 36 and partially cured resin 37. To prevent the resin in pool 43 from overflowing there is provided a guide 44. A pair of sealing rolls 49 continually seal the edges of sheets 11 and 36 together to form a fluid tight envelope before the same reaches the nip of the rolls. Upon passing underneath the roll 34 there is now a sandwich 45 comprising in cross-section a flexible sheet, a partially cured resin, a resin impregnated fibrous material, a partially cured resin and a flexible sheet. In this state it is necessary to cure the resin in the resin impregnated material and also the partially cured resins. This curing step is achieved by passing the sandwich 45 through dies 46 and a heating means 47.

The flexible sheets 11 and 36 may be of a number of different materials. Exemplary of these are cellophane, treated paper, Mylar, polyvinyl alcohol, polyvinyl chloride, polyethylene, cellulose acetate, vinyl chloride copolymer and cellulose acetate butyrate. The heating means 15, 40, and 47 may be a bank of infra-red lights. These lights may be of 250 watts each. Such a heating means is sufficient to raise the temperature to 300° C.

The resins 13, 17, 18 and 37 may be one of a number of different resins. Suitable resins are the polyester epoxy, epoxy polyamides, polyurethanes, silicones, phenolaldehyde, urea-aldehyde and resorcinol aldehydes. Other typical resins are: polymerizable unsaturated alcohol esters of unsaturated acids such as the esters of vinyl, allyl, methallyl, crotyl, beta ethyl allyl, propargyl, methyl propargyl, oleyl, linoleyl, ricinoleyl, phenyl propargyl or cinnamyl alcohol and unsaturated acids such as acrylic, methacrylic, alpha or beta chloracrylic, crotonic or cinnamic acids, including allyl acrylate, allyl alpha chloracrylate, etc.; polymerizable unsaturated alcohol polyesters of polybasic acids such as phthalic, carbonic, oxalic, succinic, adipic, azelaic, sebacic and terephthalic acids, including diallyl carbonate, diallyl maleate, diallyl fumarate, diallyl oxalate, diallyl adipate, diallyl itaconate, diallyl succinate, ethylene glycol bis (allyl carbonate), diethylene glycol bis (allyl carbonate), and mixtures thereof; polyhydric alcohol esters of the above unsaturated acids and polyhydric alcohols such as ethylene glycol, triethylene glycol, hexaethylene glycol, glycerol, sorbitol, mannitol, erythritol, polyvinyl alcohol or cellulose esters, including ethylene glycol diacrylate, ethylene glycol dimethacrylate, etc.; polyhydric alcohol polyesters of polybasic acids, including esters of the above polyhydric alcohols and maleic, fumaric, itaconic or citraconic acids. Such esters may include alkyds such as ethylene glycol maleate or fumarate or compounds such as ethylene glycol bis (methyl fumarate), ethylene glycol bis (ethylene fumarate), etc.; polymerizable ethers, including divinyl ether, etc., and copolymers of the ethers and any of the above compounds; other organic compounds containing two or more unsaturated, unconjugated groups, including divinyl benzene, divinyl naphthalene, vinyl acetylene, divinyl acetylene, etc.; in addition the process may be applied to the treatment of copolymers of the above polyfunctional materials and unsaturated compounds containing but a single unsaturated group such as vinyl acetate, methyl acrylate, acrylonitrile, methyl methacrylate, ethyl methacrylate, butyl methacrylate, styrene, vinyl chloride, vinylidine chloride, methyl itaconate, methyl fumarate, methyl alpha chloracrylate, etc.; and, other liquid polymerizable or condensible materials capable of curing to a thermosetting state, including glycerol phthalate, liquid phenol aldehyde resin, melamine aldehyde condensation products, urea condensation products or mixtures of these materials in a mixture with the above compounds containing two or more polymerizable groups may also be used in accordance with the present invention.

To the resins there are added catalysts such as benzoyl peroxide and dimethyl aniline. As is well known, these catalysts can be used separately quite effectively, but upon being added to the same resin they decrease the curing time to such an extent that the resin tends to set up in the reservoir. Therefore, it is not feasible, due to this short pot life, to use these catalysts in the same resin. In order to make good use of these catalysts in the same resin it is possible to prepare two different resins with each one having only one of the catalysts. Then, just prior to the application of the resins to the fibrous mat or flexible sheet they can be mixed. In this manner the synergistic effect of the two catalysts can be utilized without the undesirable short pot life interfering. The proportion of the use of the two catalysts may be one percent of the benzoyl peroxide and one-tenth of one percent of dimethyl aniline. The application of these resins is accomplished by a dual resin dispenser. In the application of the resin in this process the viscosity is preferably in the range of 100–700 centipoises at 25° C. The fibrous material may also be one of a number of different kinds such as fiberglass, Dacron, Orlon, cotton, nylon, duck, muslin, linen, rayon, mineral wool and asbestos. The fibrous material may be either in the mat form or in the woven form. For many purposes suitable strength is imparted if the fiber is in the mat form, while in some instances it is essential that the fibrous material be in the woven form. The strands 25 may be of the same material as the fibrous material.

In this process the sheet or sandwich may run at the rate of approximately 15 feet per minute. The bank of lights 15 and the bank of lights 40 should be sufficient to raise the temperature of the resins 13 and 37, respectively, to a temperature of about 200° C. And, the heating means 47 should be sufficient to raise the temperature of the sandwich to approximately 200° C. for a period of time of about two minutes. Turning now to FIGURE 2, there is illustrated a dual resin dispenser 48. This resin dispenser dispenses the resins 17 and 18 from the containers 20 and 21 onto the partially cured resin 13. This dispenser is so designed that the resin containers 20 and 21 move laterally across the flexible sheet 11 so as to dispense the resin when the sheet is moving. This dispenser is positioned above the table 16. It comprises a framework and motivating means for driving the two containers 20 and 21 back and forth across the table. More specifically, there are two vertical posts 50 and 51 and two horizontal rods 52 and 53 for the frame. Near the upper end of the post 50 is an aperture 54. Aligned with this is an aperture 55 near the upper end of post 51. A cylindrical rod is positioned in these two apertures and reciprocates back and forth therein. A bracket 57 depends from approximately the center of this rod and connects with a plate 58. As a guide means for this plate 58 there are two coacting guide rolls 60 and 61 on the plate. The roll 60 is above brace 52 and the roll 61 is below brace 52. Also, on the sides of the plate and near the bottom thereof are two sets of rolls 62. In each set these rolls are so positioned that one is above guide 53 and the other is below guide 53. The circumferences of all these rolls, 60, 61, and 62, are recessed so as to envelop part of the guides 52 and 53. In this manner the guides act as stationary positioners for the rolls which move back and forth on them and thereby act as positioners for the plate 58. Near the bottom and at each edge of the plate 58 are attached the resin holders 20 and 21. Connecting with the holder 20 is a resin feeder tube 63 and connecting with the resin container 21 is a resin feeder tube 64. The tubes 63 and 64 are of a flexible material such as rubber.

The motivating means for the plate 58 is a drive comprising chain 65. This chain is attached to the plate 58 by means of bolt 66.

On post 50 and about at the middle height thereof is a shaft 69 which projects outwardly therefrom. On the shaft 69 is a gear or sprocket 67. Similarly, on post 51 and at about the middle height thereof is a shaft 68 which projects outwardly. On this shaft is mounted a sprocket or gear 70. This sprocket 67 is positioned on the shaft 66 by set screw 71 and the sprocket 70 is positioned on the shaft 68 by set screw 72. As is appreciated, the chain 65 runs around the two sprockets 67 and 70 and is driven by the sprocket 70. More particularly, the driving means comprises two inwardly facing disks 73 and 74 on the shaft 68. The disk 73 is attached to the shaft 68 by means of a set screw 75 and the disk 74 is attached by set screw 76 to the shaft 68. These two disks are in the configuration of a frustum of a cone with the sloping sides facing each other but positioned apart on the same shaft. A drive cone 77 is used to rotate either of these disks. This cone 77 is positioned on the head of shaft 78 in motor 80. The motor 80 is on rotatable platform 81. As is seen in FIGURES 2 and 3, the platform is carried on a shaft 82 whose ends are in bearing blocks 83. The longitudinal axis of the rod 82 is substantially parallel to the long axis of the motor shaft 78. The platform 81 can be rotated by means of a linkage connecting with the drive rod 56.

In this linkage there is a stud 84 attached to the platform 81 and projecting towards the apparatus 48. Projecting near the bottom of the vertical post 51 and projecting outwardly from the side therefrom is a lug 85. In the end of this lug 85 is a shaft 86. This shaft acts as a pivot for crank 87. The crank has an arm 88 and a long arm 90. The short arm ends in a hook-like member having fingers 91 and 92. These fingers partially encircle stud 84. The long arm ends in an encircling disk 93 having cylindrical passageway 94 therein. This disk 93 encircles the end of the rod 56. As is seen the end of this rod is outside of the post 51. On the rod are two stops 95 and 96. These stops are spaced apart and the disk 93 is between them. On the rod 56 and between the post 51 and the bracket 57, but near post 51, is a stop 97. And, on the rod 56 and between the post 50 and the bracket 57, but near post 50 is a stop 99.

The manner in which this driving means operates is described in the following. Referring to FIGURE 3 it is seen that the cone 77 is bearing against disk 73. As indicated between arrows, see also FIGURE 2, the disk 73 is rotating in counter clockwise direction. As the cone drives the disk 73 the holder plate 58, and therefore the rod 56 are moved towards post 50. This means that stop 95 is moved towards disk 93. When stop 97 contacts bracket 57 it rotates crank 87 in a counter clockwise direction, thereby rotating the platform 81. With the rotating of the platform 81 the cone 77 is also rotated or moved so that it no longer contacts disk 73 but contacts instead disk 74. It is to be realized that the motor 80 drives the shaft 78 and the cone 77 in only one direction. Therefore, the disk 74 and the shaft 68 rotate in a clockwise direction. This moves the holder 58 away from post 50 and towards post 51. Therefore, the rod 56 is moved and the stop 96 is moved away from both posts 50 and 51 toward disk 93. The stop 96, upon contacting disk 93, rotates the platform 81 so that the cone 77 now is removed from contact with disk 74 and contacts disk 73. This means that the disk 73 and the shaft 68 are now rotating in a counter clockwise direction. This process continues as long as the machinery operates.

Figure 4:
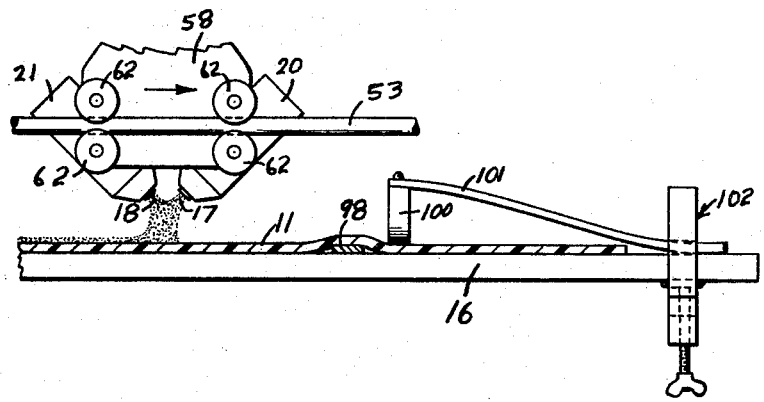
FIGURE 4 is a fragmentary elevational view of the control means for mixing the two resins and of a dam for controlling the flow of the resins.

In FIGURE 4 there is illustrated means for restricting the flow of the liquid resin on the partially cured resin 11. The sheet 11 rests on the table 16. Near the outer edge of this sheet and upon the table 16 and the sheet 11 is placed a wedge or runner passing out 98. The sheet 11 in passing over the runner 98 forms a dam to prevent the flow of resin. A secondary dam 100 or the like is forced down by the spring 101 against the sheet 11 on the outside of the runner 98. This is to position the resin on the sheet. This spring and dam are held in position by clamp 102.

Figure 5:
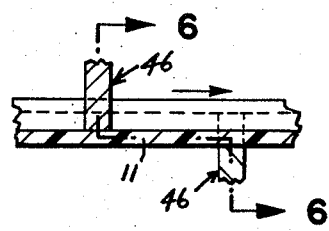
FIGURE 5 is a fragmentary side elevational view of offset dies employed in this application; and, FIGURE 6 is a fragmentary plan view of the offset dies and is taken on line 6—6 of FIGURE 5.
Figure 6:
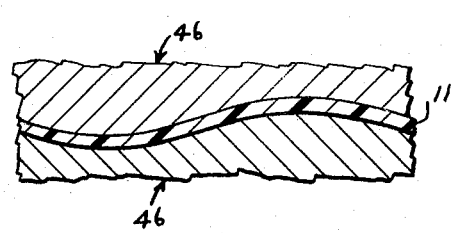

The dies 46 are offset dies and are depicted more fully in FIGURE 5 and FIGURE 6. By offset dies I mean that the mating members are not positioned one above the other but are offset from each other. In FIGURE 5 and FIGURE 6 are illustrated dies to make a corrugated sheet or panel. As is seen the sandwich 45 passes between these two dies at different horizontal positions. One advantage of this is that the dies can be made with a wider tolerance than mating dies can be. Also, because of this wider tolerance and the fact that the dies are not positioned one above the other there flows the beneficial result of the dies being able to pass a clump of fibrous material in the sandwich. For example, in fiberglass mat it is not always possible to form the mat without certain imperfections such as a gathering of the fiberglass strands. These strands may form a clump. When impregnated with a liquid resin and then placed in a sandwich the clump may still remain. In matched and mating dies with a close tolerance the clump may be too big to go between the two members. Upon being pulled between the dies the clump offers resistance and quite often the carrying sheet of cellophane tears. This necessitates the shutting down of the equipment and the removal of the torn sandwich. Naturally, there is a loss of time and material. In my process the dies tend to pass the sandwich without clumping of the fibers therein and clumps of fibers in the sandwich without tearing the film. As a result the equipment does not need to be shut down because of the tearing of the sandwich.

My process and apparatus is readily adaptable to the continuous manufacture of articles of compound shapes and configurations such as bubble-dome skylights, gutters, molding and curvaceous vessels and the like. With my process it is necessary to employ only a single mold instead of the usual male-female mold combination. In other words, only one master mold needs to be prepared, lessening the mold expense. Generally speaking, the sandwich of carrier sheet, resin-impregnated mat, carrier sheet is placed on the mold and by means of a vacuum, or reduction in air pressure, the sandwich made to conform to the configuration of the mold. Then, the resin in the sandwich is cured under heat.

In a particular instance, consider the making of a bubble-dome skylight. The mold itself is in the configuration of a bubble-dome. The base of the mold is generally in a square configuration and rises in the middle into the bubble-dome. At each corner of the square are taps for applying a vacuum. The sandwich of carrier sheet, resin-impregnated mat and carrier sheet is placed on the mold and a vacuum applied to the taps. The sandwich takes the configuration of the mold, i.e., the lower carrier is pressed firmly against the mold. Because of the atmospheric pressure the upper carrier sheet and the sandwich are pressed firmly downwardly to conform to the configuration of the mold.

Gutters and molding can be prepared in a similar manner by means of a single master mold, a vacuum attachment, and said sandwich.

Naturally, the sandwich is continuous due to the nature of the carrier sheet and the fibrous core. Therefore, there are necessitated a number of molds so that part of the sandwich can be placed on one mold, a space left between this mold and the next succeeding mold whereon additional sandwich is placed. This process can be repeated for a large number of molds, such as eight or eighteen. The sandwich with the liquid resin therein is not cut or separated into individual units. Instead, the molds with the sandwich on them are passed through heat ovens to cure the resin into a hard state. Upon the resin being cured and the bubble-domes formed then the sandwich is cut. At this time there is no liquid resin to run out and make a mess.

In carrying out this continuous process I have found that the carrier sheet should be of a polyvinyl material such as polyvinyl alcohol or polyvinyl acetate. The styrene or vinyl toluene in the liquid resin softens the polyvinyl film. This makes it possible for the film to more readily take the configuration of the mold.

This continuous process for making a complicated molded configuration is made possible because of the good impregnation of the fibrous mat by my apparatus and also because it is possible to use catalysts which make the resins cure rapidly. The good impregnation of the mat insures an even distribution of the resin therein. And, the catalysts in the fast curing resins lessen the tendency of the resins to run out of that part of the mat at high altitudes and into that part of the mat at the lower altitudes.

Furthermore, the use of heating means such as quartz infra-red lights assists in rapidly curing the resin. For example, quartz infra-red lights can operate at a temperature as high as 1500° F. This is to be contrasted with glass infra-red lights which operate at a temperature of about 600° F.

Although I have described my process with respect to the making of the partially cured resin, then the laying of a resin and an impregnated mat over this partially cured resin, it is to be realized that in certain instances it may be desirable to eliminate the step of partially curing the resin. In other words, it may be desirable to practice my process by laying a resin on a flexible sheet, placing a fibrous material over the resin and bringing it around a drum or roll so as to allow the resin to work its way through the fibrous material and for the material to settle into the resin, and then placing another flexible sheet over the fibrous material. The fibrous material in the mat which is impregnated with resin may be fiberglass, Dacron, Orlon, nylon, rayon or cotton. This fibrous material may be in a mat or fabric form. Generally speaking, the mat form is less expensive than the fabric form. As another characteristic, the edges of the sandwich comprising carrier sheet, resin-impregnated mat, carrier sheet, may be sealed by a binding agent such as a tape or may be sealed by heat so as to have a heat-sealed edge which prevents resin running out of the sandwich between the carrier sheets.

In the claims:

1. An apparatus for making a plastic, said apparatus comprising a guide for a plastic sheet, means for applying a resin to the plastic sheet, a curing means for partially curing the resin onto the sheet, means for applying additional resin to the partially cured resin, said last means comprising a holder for two resin containers, said holder being capable of moving in a reciprocating motion, said holder connecting with two juxtapositioned bearing surfaces, a driving head spaced between said two bearing surfaces and adapted to bear against either one, said driving head being pivoted, limit position means for said holder, limit position means co-operatively adjusted with said driver so that upon one limit means being actuated the driver bears against one bearing surface and the other limit means being actuated the driver bears or is pivoted to bear against the other bearing surface, means to apply a fibrous material to the resin on the partially cured resin, means to apply strands of material on the outer surface of the fibrous material, a drum, means to pull the flexible sheet, partially cured resin, resin and fibrous material around said drum, means to apply a flexible sheet to the outer surface of the fibrous material, and a curing means to cure the resin.

2. A process for making a plastic, said process comprising laying a liquid resin on a first flexible carrier sheet, subjecting the liquid resin to heat to partially cure the same, applying liquid resin to the partially cured resin, laying a fibrous material over the liquid resin so as to let the liquid resin work its way up and through the fibrous material to expel entrapped gas, the flexible sheet, partially cured resin, liquid resin and fibrous mat being a composite structure, bending said composite structure so that the fibrous mat is on the outside of the composite structure and presents a convex surface under tension, thereby permitting the liquid resin to work its way through the mat, applying a second flexible sheet to the face of the fibrous mat and sealing together the edges of the first and second flexible sheets to form a sandwich of the sheet, partially cured resin, resin-impregnated mat and sheet, and curing said sandwich to form said plastic comprising a composite structure of a resin-impregnated mat and a resin on one face of said resin-impregnated mat.

3. A process for making a plastic, said process comprising applying a resin to a first flexible carrier sheet, partially curing said resin, applying two resins to said partially cured resin, in the application of said two resins mixing the same while applying, applying a fibrous material on top of said two mixed resins so that the two mixed resins can rise in the material and expel entrapped gas, applying strands over the fibrous material to rigidly hold the material on the sheet, and applying a second flexible sheet over the flexible strands and the fibrous material and sealing together the edges of the first and second flexible sheets to form a sandwich of sheet, partially cured resin, fibrous material, flexible strands and sheet, and curing said sandwich to form said plastic comprising a composite structure of a resin-impregnated mat and a resin on one face of said resin-impregnated mat.

4. A process for making a plastic, said process comprising applying two resins to a first flexible carrier sheet, in the application of said two resins mixing the same after the resins have left their respective containers, applying a fibrous material on top of said two mixed resins so that the two mixed resins can rise in the material and expel entrapped gas, the flexible sheet and resin-impregnated fibrous mat being a composite structure, bending said composite structure so that the fibrous mat is on the outside of the bend thereby permitting the liquid resin to work its way through the mat and expel air from the mat, placing said composite structure on a mold with the flexible sheet in contact with the mold, forcing said composite structure to conform to the configuration of the mold by applying a vacuum to the mold so that the flexible sheet assumes the configuration of the mold, curing said resin and said plastic comprising the resin-impregnated fibrous mat free of the flexible sheets.

5. A process for making a plastic, said process comprising laying a liquid resin on a moving flexible carrier sheet, subjecting the liquid resin to heat to partially cure the same, applying liquid resin to the partially cured resin, laying a fibrous material over the liquid resin so as to let the liquid resin work its way up and through the fibrous material to expel entrapped gas, the first flexible sheet, partially cured resin, liquid resin and fibrous material being a composite structure, bending the composite structure so that the fibrous mat is on the outside of the composite structure and thereby permitting the liquid resin to work its way through the fibrous material so as to completely immerse the fibrous material, applying a second flexible sheet to the face of the fibrous material to form a sandwich of sheet, partially cured resin, resin-impregnated mat, and sheet, curing the resin in said sandwich, and said plastic comprising the resin-impregnated material with the resin on one surface and free of the flexible sheets.

6. A process for making a plastic, said process comprising laying a liquid resin on a first flexible carrier sheet, partially curing said liquid resin, applying liquid resin to the partially cured resin, laying a fibrous material over the liquid resin so as to let the liquid resin work its way up and through the fibrous material to expel entrapped gas, the first flexible carrier sheet, the partially cured resin, liquid resin and fibrous mat being a composite structure; laying a liquid resin on a second flexible carrier sheet, partially curing said liquid resin, laying said second flexible carrier sheet and partially cured liquid resin on said composite structure so as to have a sandwich comprising a first flexible carrier sheet, partially cured resin, fibrous material impregnated with liquid resin, partially cured resin and second flexible carrier sheet, and curing said sandwich to form said plastic comprising a composite structure of a resin-impregnated mat and a resin on both faces of said resin-impregnated mat.

7. A process for making a plastic, said process comprising laying a liquid resin on a first flexible carrier sheet, subjecting the liquid resin to heat to partially cure the same, applying liquid resin to the partially cured resin, laying a fibrous material over the liquid resin so as to let the liquid resin work its way up and through the fibrous material to expel entrapped gas, the first flexible carrier sheet, the partially cured resin, liquid resin and fibrous mat being a composite structure; bending said composite structure so that the fibrous mat is on the outside of the composite structure and presents a convex surface under tension thereby permitting the liquid resin to work its way through the mat; laying a liquid resin on a second flexible carrier sheet, subjecting the liquid resin to heat to partially cure the same, applying said second flexible carrier sheet with the partially cured resin to the face of the fibrous mat and sealing together the edges of the first and second carrier sheets to form a sandwich of the first flexible carrier sheet, partially cured resin, resin-impregnated mat, partially cured resin and second flexible carrier sheet, and curing said sandwich to form said plastic comprising a composite structure for resin-impregnated mat and a resin on both faces of said resin-impregnated mat.

References Cited by the Examiner

UNITED STATES PATENTS

| | | | |
|---|---|---|---|
| 601,960 | 4/98 | Hartmann | 141—232 |
| 1,005,984 | 10/11 | Lealand | 141—231 |
| 1,740,032 | 12/29 | Pecard | 141—233 |
| 1,886,928 | 11/32 | Wyss | 154—37 |
| 2,593,553 | 4/52 | Francis | 154—37 |
| 2,614,059 | 10/52 | Cooper | 154—110 |
| 2,614,955 | 10/52 | Halsall | 156—232 |
| 2,637,673 | 5/53 | Barnard. | |
| 2,681,870 | 6/54 | Novak. | |
| 2,719,806 | 10/55 | Nottebohm | 154—101 |
| 2,779,689 | 1/57 | Reis. | |
| 2,784,763 | 3/57 | Shorts | 156—206 XR |
| 2,803,577 | 8/57 | Colt et al. | 154—110 |
| 2,841,205 | 7/58 | Bird. | |
| 2,844,354 | 7/58 | Warnken | 154—110 XR |
| 2,927,623 | 3/60 | Huisman et al. | 156—179 |
| 2,939,509 | 6/60 | Hoffman | 156—206 |
| 2,968,335 | 1/61 | Monaco et al. | 156—247 XR |
| 3,010,861 | 11/61 | Reese | 156—214 XR |
| 3,025,207 | 3/62 | Chetakian | 156—246 |

EARL M. BERGERT, *Primary Examiner.*

JAMES S. BAILEY, RICHARD LEIBOWITZ, ALEXANDER WYMAN, CARL F. KRAFFT, *Examiners.*